(12) United States Patent
Fribus

(10) Patent No.: US 12,172,661 B2
(45) Date of Patent: Dec. 24, 2024

(54) OPERATING DEVICE, VEHICLE AND METHOD FOR OPERATING A VEHICLE

(71) Applicant: ZF Friedrichshafen AG, Friedrichshafen (DE)

(72) Inventor: Vitali Fribus, Quakenbrück (DE)

(73) Assignee: SIGNATA GmbH, Diepholz (DE)

( * ) Notice: Subject to any disclaimer, the term of this patent is extended or adjusted under 35 U.S.C. 154(b) by 266 days.

(21) Appl. No.: 17/784,299

(22) PCT Filed: Dec. 7, 2020

(86) PCT No.: PCT/EP2020/084854
§ 371 (c)(1),
(2) Date: Jun. 10, 2022

(87) PCT Pub. No.: WO2021/116007
PCT Pub. Date: Jun. 17, 2021

(65) Prior Publication Data
US 2023/0038816 A1 Feb. 9, 2023

(30) Foreign Application Priority Data
Dec. 12, 2019 (DE) ...................... 10 2019 219 437.0

(51) Int. Cl.
*B60W 50/14* (2020.01)

(52) U.S. Cl.
CPC ....... *B60W 50/14* (2013.01); *B60W 2050/146* (2013.01)

(58) Field of Classification Search
CPC ..................................................... B60W 50/14
See application file for complete search history.

(56) References Cited

U.S. PATENT DOCUMENTS

| 2010/0140059 A1* | 6/2010 | Kagami | H01H 19/11 200/14 |
| 2017/0045958 A1* | 2/2017 | Battlogg | G06F 1/169 |
| 2018/0229704 A1* | 8/2018 | Eck | B60K 35/10 |
| 2018/0291979 A1* | 10/2018 | Mao | F16F 15/173 |

FOREIGN PATENT DOCUMENTS

EP 1 428 699 A1 6/2004

OTHER PUBLICATIONS

International Search Report and Written Opinion of the International Search Authority mailed Mar. 23, 2020, in International Application No. PCT/EP2020/084854 (English and German languages) (10 pp.).

* cited by examiner

*Primary Examiner* — Peter D Nolan
*Assistant Examiner* — Luke Huynh
(74) *Attorney, Agent, or Firm* — Crowell & Moring LLP

(57) ABSTRACT

An operating device includes a first operating element with which a user can select one or numerous main functions of a vehicle and that can rotate about an axis of rotation and has at least one predefined fixed rotational position. A second operating element with which a user can adjust subfunctions of the main function can rotate about the axis of rotation and also comprises an actuator unit that comprises a magnetorheological medium configured to exert a retaining force on the second operating element based on a viscosity of the magnetorheological medium. The actuator unit is configured to set the viscosity on the basis of the main function selected with the first operating element, and on the basis of a rotational position of the second operating element.

20 Claims, 3 Drawing Sheets

OPERATING DEVICE, VEHICLE AND METHOD FOR OPERATING A VEHICLE

CROSS-REFERENCE TO RELATED APPLICATIONS

This application is a U.S. national stage application under 35 U.S.C. § 371 of PCT Application No. PCT/EP2020/084854, filed on Dec. 7, 2020, and published as WO 2021/116007 A1 on Jun. 17, 2021, which claims priority from German Application No. DE 10 2019 219 437.0, filed on Dec. 12, 2019, the entirety of which are each hereby fully incorporated by reference herein.

The present invention relates to an operating device for a vehicle, a vehicle, and a method for operating a vehicle.

Operating elements that can be turned and pressed in order navigate in a function menu may be used for operating vehicle functions.

With this background, the present invention results in an improved operating device for a vehicle, an improved vehicle, and an improved method for operating a vehicle according to the independent claims. Advantageous embodiments can be derived from the dependent claims and the following description.

Various embodiments of an operating device can be obtained for operating a vehicle, or to control vehicle functions, in particular with both variable and static haptics. Such an operating device can be obtained for an intuitive operation of vehicle functions by combining a first rotating actuator with a mechanical notching, and a second rotating actuator with a variable haptics on the same axis of rotation. The second rotating actuator can comprise a magnetorheological medium for this. In this manner, a haptic operating element with both a variable as well as a static haptics can be obtained, for example, with which it is possible to intuitively operate numerous different vehicle functions, in particular driving functions, comfort functions, infotainment functions, etc. in the vehicle. In particular, numerous vehicle functions can advantageously be operated with a compact and intuitive operating unit according to these embodiments.

An operating device for a vehicle comprises a first operating element with which a user can select a main vehicle function, which can rotate about an axis of rotation, and which has at least one predefined fixed rotational position, a second operating element with which a user can make adjustments to subfunctions of the main functions selected with the first operating element, which can rotate about the same axis of rotation, and an actuator unit comprising a magnetorheological medium, which is coupled to the second operating element and is configured to exert a retaining force on the second operating element on the basis of a viscosity of the magnetorheological medium, in which the actuator unit is configured to set the viscosity of the magnetorheological medium based on the main function that has been selected with the first operating element, and based on a rotational position of the second operating element.

The vehicle can be a motorized cycle such as a motorcycle or scooter, or some other land vehicle, aircraft, or watercraft. The operating device can be used to operate driving functions such as gear shifting, accelerating, braking, and lighting functions, etc., as well as comfort functions and infotainment functions. The first operating element and second operating element can rotate about the same axis. The retaining force based on the main function selected with the first operating element and based on the rotational position of the second operating element can represent a notching, a course of the retaining force as a function of the rotational position, and/or an arrangement of notchings or fixed rotational positions of the second operating element, depending on the main function that has been selected. The first operating element can have a static feel with at least one mechanical notching that defines the at least one fixed rotational position. The second operating element can have a variable feel that has notching positions for fixed rotational positions obtained by means of the actuator unit on the basis of the selected main function. The operating elements can form sleeves, swivels, rotating actuators, etc. Depending on the strength of the retaining force, the second operating element may be fixed in position, easily moved, or only moved with difficulty from the perspective of the user, and nearly any intermediate level of mobility can be adjusted to with an appropriate setting of the viscosity of the magnetorheological medium. As a result, an actuation force necessary for moving the second operating element can be adjusted to an operating functionality currently provided by the operating device, or to the subfunctions of the respective main function selected with the first operating element. The magnetorheological medium can be a medium that comprises particles that can be magnetically polarized. This can be a magnetorheological fluid (MRF) in particular, such as that already used for various vehicle applications. Alternatively, it can be a magnetorheological elastomer. The actuator unit can be configured to set the viscosity of the magnetorheological medium on the basis of a value for a magnetic field acting on the magnetorheological medium. A greater viscosity relates to a greater retaining force. The value for the retaining force can be adjusted by adjusting the viscosity. A change in viscosity can therefore result in a change in the retaining force.

According to one embodiment, the first operating element can have a fixed rotational position for each main function. This embodiment has the advantage that it enables a reliable selection of the main functions. Alternatively, the first operating element can be rotated in at least one direction from a single fixed rotational position in order to switch between the various main functions that can be selected. In this case, the main functions can be selected by "toggling" or switching between them. The first operating element can be automatically returned to the fixed rotational position after each time it is rotated. Each rotation can result in a switching to a main function. In this manner, a first operating element can be obtained that has a particularly simple construction.

The first operating element can also have an indicator element that points to the selected main function. The indicator element can form a projection extending outward from the circumference of the first operating element. This makes it easy for a user to quickly and accurately see which main function is selected.

Symbols representing the main functions can be placed on the operating device encircling the first operating element. These symbols can be printed thereon. They can also be illuminated. These symbols can also be displayed on a screen. A symbol can indicate the main function it represents in a graphical or alphanumerical manner. A symbol can be displayed using at least one display or at least one screen, for example. Such an embodiment has the advantage that, depending on the desired embodiment of the operating device, symbols can be used for the main functions that are easy to read.

The operating device can also have a display unit for displaying the subfunctions of the main functions selected with the first operating element. This embodiment has the advantage of an intuitive actuation of the operating device, without using another display device on the vehicle. Alternatively, the operating device can be connected for signal transfer to a display on the vehicle in order to display the subfunctions of the main functions that are selected with the first operating element.

The display unit can be fixed in place within the circumference of the second operating element such that it does not rotate conjointly therewith. This embodiment has the advantage that the complete operating device can be structurally compact. Alternatively, the display unit 360 can be integrated in the second operating element 230. The display unit can also be located outside the operating element. This results in a particularly cost-effective operating device.

The operating device can also contain a detection element that is configured to detect a rotational position of the first operating element and a rotational position of the second operating element.

This detection element can generate a control signal for controlling the operation of the vehicle based on the detected rotational position of the first operating element and the detected rotational position of the second operating element. This embodiment has the advantage that the operation of the vehicle can be intuitively and reliably controlled with the operating device.

The actuator unit can also be configured to set the viscosity of the magnetorheological medium on the basis of the detected rotational position of the first operating element. As a result, a feel of the second operating element can be adjusted to the subfunctions for the selected main function. This feel can therefore be adjusted with regard to numerous subfunctions and/or with regard to at least one other property of the subfunction.

The detection element can also be configured to output the detected rotational position of the first operating element to a display unit in the operating device, or to provide this detected rotational position for output thereto, in order to display the subfunctions of the main function selected with the first operating element. This display unit can be configured to display the subfunctions of the selected main function on the basis of the detected rotational position of the first operating element. As a result, the relevant subfunctions can be reliably displayed to the user.

According to one embodiment, the first operating element and second operating element can be concentric and have different radii. This embodiment has the advantage that a compact construction along the axis of rotation can be obtained that can be easily operated. Alternatively, the first operating element and second operating element can be offset coaxially to one another along the axis of rotation. This results in a compact lateral construction of the operating device in relation to the axis of rotation. The surface of the first and/or second operating elements that the user comes in contact with can also be ribbed. This embodiment has the advantage that the first and/or second operating elements can be reliably rotated, without slipping.

A vehicle can have an embodiment of the operating device described above. The operating device can be deployed or used in the vehicle to control vehicle functions in order to operate the vehicle.

A method for operating such a vehicle comprises the following steps:
detecting a rotational position of the first operating element in the operating device;
adjusting a viscosity of the magnetorheological medium in the actuator unit in the operating device on the basis of the detected rotational position of the first operating element;
detecting a rotational position of the second operating element in the operating device; and
determining a control signal for controlling the operation of the vehicle on the basis of the detected rotational position of the first operating element and the detected rotational position of the second operating element.

The steps of the method can be implemented in a component that can be part of the operating device or part of a control unit for the vehicle. Such a component can be an electrical device that processes electrical signals and outputs control signals on the basis thereof. The component can have one or more interfaces for this, which can be in the form of hardware or software. Hardware interfaces can be part of an integrated circuit, for example, in which the functions of the device are implemented. The interfaces can also be separate, integrated circuits or at least be composed of discrete components. Software interfaces can be software modules on a microcontroller that can also contain other software modules.

A computer program is also advantageous, which contains program code that can be stored on a machine-readable medium such as a semiconductor memory, hard disk, or optical memory and used for executing the method according to any of the embodiments described above when the program is executed on a computer or a device.

The invention shall be described in greater detail below in reference to the attached drawings. Therein:

In the following description of preferred exemplary embodiments of the present invention, the same or similar reference symbols are used for the elements having similar functions shown in the various figures, without repetition of the descriptions of these elements.

Figure 1:
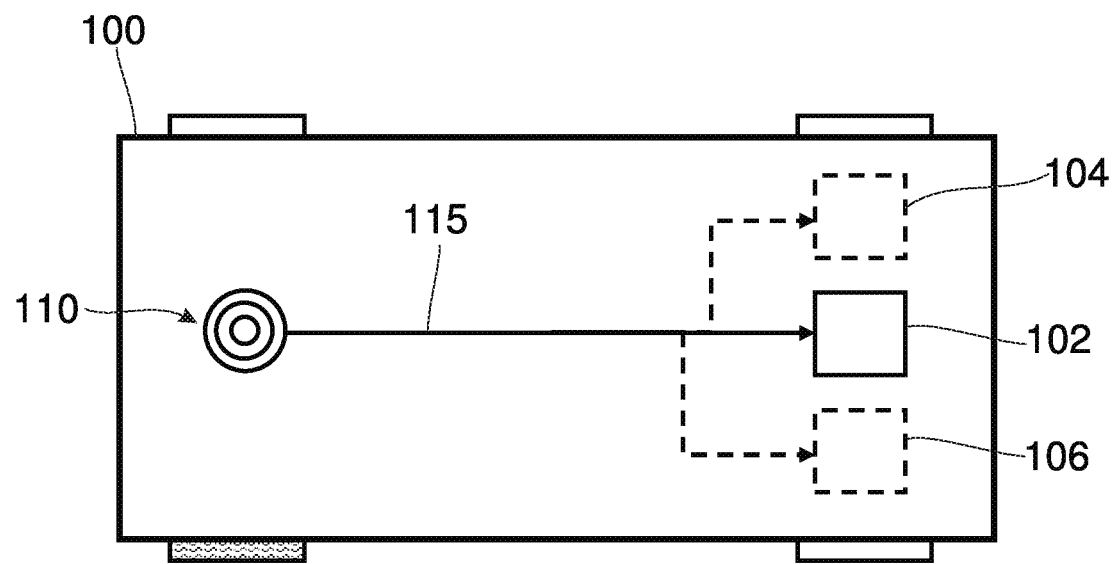
FIG. 1 shows a vehicle with an operating device according to an exemplary embodiment.

FIG. 1 shows a vehicle 100 that has an operating device 110 according to an exemplary embodiment. The vehicle 100 is a motor vehicle, e.g. a two-wheeled or four-wheeled vehicle, in particular a motorcycle, passenger automobile, or commercial vehicle. The vehicle 100 contains the operating device 110. Operation of the vehicle 100 via vehicle functions can be controlled by a user, in particular an operator of the vehicle, operating the operating device 110. This operating device 110 is connected for signal transfer to at least one vehicle component 102, 104, 106. Each of these vehicle components 102, 104, 106 can be assigned its own main function for operating the vehicle 100, e.g. a transmission or gear selection or drive position selection, lighting control, assistance function, etc. The operating device 110 is configured to generate a control signal 115 in response to actuation by a user, which is then output to at least one vehicle component 102, 104, 106.

Only three vehicle components 102, 104, 106 are shown in this exemplary embodiment. The vehicle 100 can have at least one other vehicle component. By way of example, the first vehicle component 102 can be a component for controlling a transmission. In this case, the first vehicle component 102 can be controlled with the control signal 115 when the user actuates the operating device 110 appropriately, in order to select a gear or driving stage in the vehicle's 100 transmission. The second vehicle component 104 can be a component for controlling the vehicle lighting. The second vehicle function 104 can be controlled with the control signal 115 when the user actuates the operating device 110 appropriately, in order to control the functions of the lighting system. The third vehicle component 106 can be an assistance component. When the operating device 110 is actuated appropriately by the user, the third vehicle component 106 can be controlled using the control signal 115 in order to control or regulate assistance functions in the vehicle 100.

Figure 2:
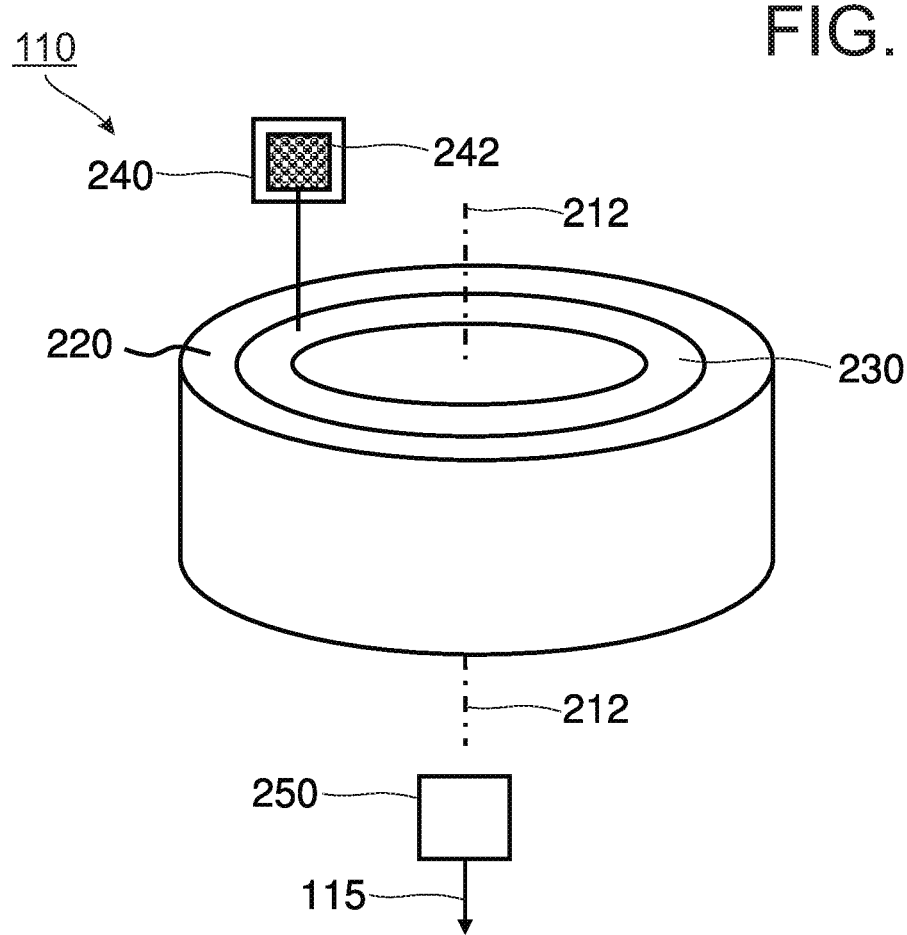
FIG. 2 shows an operating device according to an exemplary embodiment.

FIG. 2 shows an operating device 110 according to an exemplary embodiment. This operating device 110 is illustrated schematically. The operating device 110 corresponds, or is similar, to the operating device in FIG. 1. In other words, the operating device 110 is shown in greater detail in FIG. 2.

The operating device 110 has a first operating element 220, a second operating element 230, and an actuator unit 240 with a magnetorheological medium 242. The operating device 110 also has a detection element 250. The first operating element 220 and second operating element 230 can be actuated by a user.

The first operating element 220 is designed so that the user can select one of numerous main functions for the vehicle. This first operating element 220 can rotate about an axis of rotation 212. The first operating element 220 has at least one predefined fixed rotational position. The user can rotate the first operating element 220 in order to select a main function for the vehicle. The first operating element 220 is in the form of a rotational ring, rotating actuator, sleeve, etc.

The second operating element 230 is used by the user to adjust subfunctions of the main function selected with the first operating element 220. The second operating element 230 can also rotate about the axis of rotation 212. The second operating element 230 and the first operating element 220 can therefore rotate about the same axis of rotation 212. In other words, the axis of rotation 212 is the same axis of rotation 212 for the first operating element 220 and the second operating element 230. The second operating element 230 can be rotated by the user to adjust the subfunctions of the selected main function.

The actuator unit 240 is coupled to the second operating element 230. The actuator unit 240 contains the magnetorheological medium 242. The actuator unit 240 is configured to exert a retaining force on the second operating element 230 based on a viscosity of the magnetorheological medium. The actuator unit 240 is configured to set the viscosity of the magnetorheological medium 242 on the basis of the main function selected with the first operating element 220 and on the basis of a rotational position of the second operating element 230.

In other words, the actuator unit 240 is configured to subject the second operating element 230 to a force curve or a notching, or an arrangement of fixed rotational positions via the viscosity of the magnetorheological medium 242 that can be adjusted on the basis of the selected main function. As a result, the force curve, notching positions, or arrangement of fixed rotational positions for the second operating element 230 can be set in a variable manner by the actuator 240, based on the selected main function.

The illustration of the operating device 110 in FIG. 2 also shows a detection element 250. The detection element 250 is configured to detect a rotational position of the first operating element 220 and a rotational position of the second operating element 230. The detection element 250 detects the rotational positions by means of an inductive, capacitive, and/or magnetic measurement. In this exemplary embodiment, the detection element 250 is also configured to generate a control signal 115 for the operation of the vehicle on the basis of the detected rotational positions of the first operating element 220 and the second operating element 230. The control signal 115 corresponds, or is similar, to the control signal generated in FIG. 1. The actuator unit 240 is also configured in this exemplary embodiment to set the viscosity of the magnetorheological medium 242 on the basis of the rotational position of the first operating element 220 detected with the detection element 250.

The first operating element 220 and second operating element 230 in this exemplary embodiment are concentric in relation to the axis of rotation 212 and have different radii. The first operating element 220 has a greater radius than the second operating element 230. The second operating element 230 is therefore at least partially within the circumference of the first operating element 220. In another exemplary embodiment, the first operating element 220 and second operating element 230 are offset coaxially along the axis of rotation 212.

Figure 3:
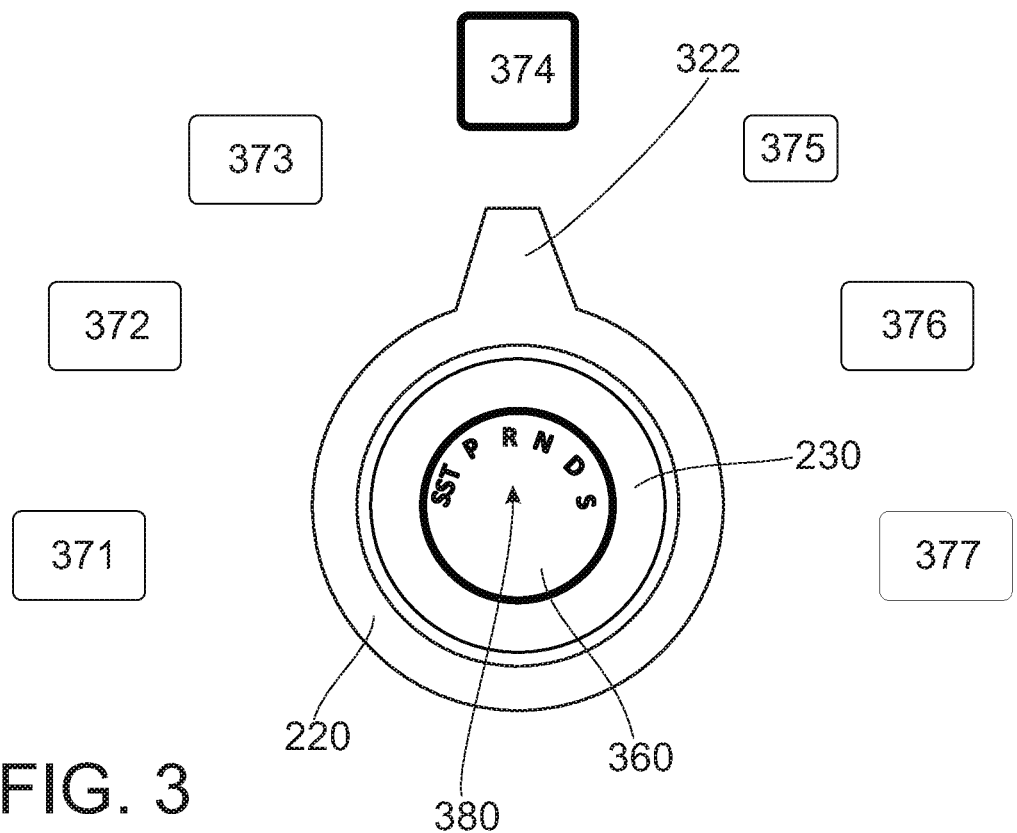
FIG. 3 shows an operating device according to an exemplary embodiment.

FIG. 3 shows an operating device 110 according to an exemplary embodiment. The operating device 110 corresponds, or is similar, to the operating device in FIG. 2. The illustration of the operating device 110 in FIG. 3 shows the first operating element 220, the second operating element 230, an indicator element 322, a display unit 360, numerous symbols 371, 372, 373, 374, 375, 376, and 377 representing the main functions, and numerous symbols 380 representing the subfunctions.

The indicator element 322 is on the first operating element 220. This indicator element 322 is formed by a projection, or pointer, on the first operating element 220. The indicator element 322 points to the main function that has been selected. The operating element 220 has a fixed rotational position for each of the main functions in this case. In this exemplary embodiment, the first operating element 220 has at least seven fixed rotational positions, by way of example. These correspond to seven main functions.

A first symbol 371 represents a first main function, e.g. a trailer assist. The second symbol 372 represent a second main function, e.g. a parking assist. The third symbol 373 represents a third main function, e.g. lighting, or lighting control. The fourth symbol 374 represents a fourth main function, e.g. gear selection, or the driving stage selection for a transmission. The fifth symbol 375 represents a fifth main function, e.g. an assistance function for an adaptive cruise control. The sixth symbol 376 represents a sixth main function, e.g. activation of vehicle components for various presets, e.g. ECO, COMFORT, SPORT, etc. The seventh symbol 377 represents a seventh main function, e.g. a recuperation function.

The symbols 371, 372, 373, 374, 375, 376, and 377 representing the main functions are arranged around the first operating element 220 in this exemplary embodiment. These symbols 371, 372, 373, 374, 375, 376, and 377 are printed, and/or illuminated, and/or displayed on a display. The fourth main function is selected in FIG. 3, which is the gear selection or driving stage selection for a transmission in this case. The indicator element 322 is therefore pointing to the fourth symbol 374. The fourth symbol 374 can also be optically highlighted by an illumination, coloration, or some other means.

The display unit 360 displays the subfunctions of the main function selected with the first operating element 220. The display unit 360 is fixed in place within the first operating element 220 and second operating element 230 such that it does not rotate conjointly therewith within the circumference of the second operating element 230. The display unit 360 is configured to display further symbols 380, which represent the subfunctions of the main functions that are selected. In other words, the display unit 360 presents a visualization of each main function, or the subfunctions belonging to the selected main function.

According to one exemplary embodiment, the display unit 360 is integrated in the second operating element 230. The display unit 360 can also be touch-sensitive. In another exemplary embodiment, the display unit 360, or a display element similar to display unit 360 can be located outside the operating elements 220 and 230 in the vehicle.

According to one exemplary embodiment, the first operating element 220 can be rotated in at least one direction from a single fixed rotational position, in order to switch between the various main functions. In this case, the operating element 220 does not need the indicator element 322. The selected main function can be merely highlighted optically, or displayed in this case.

Figure 4:
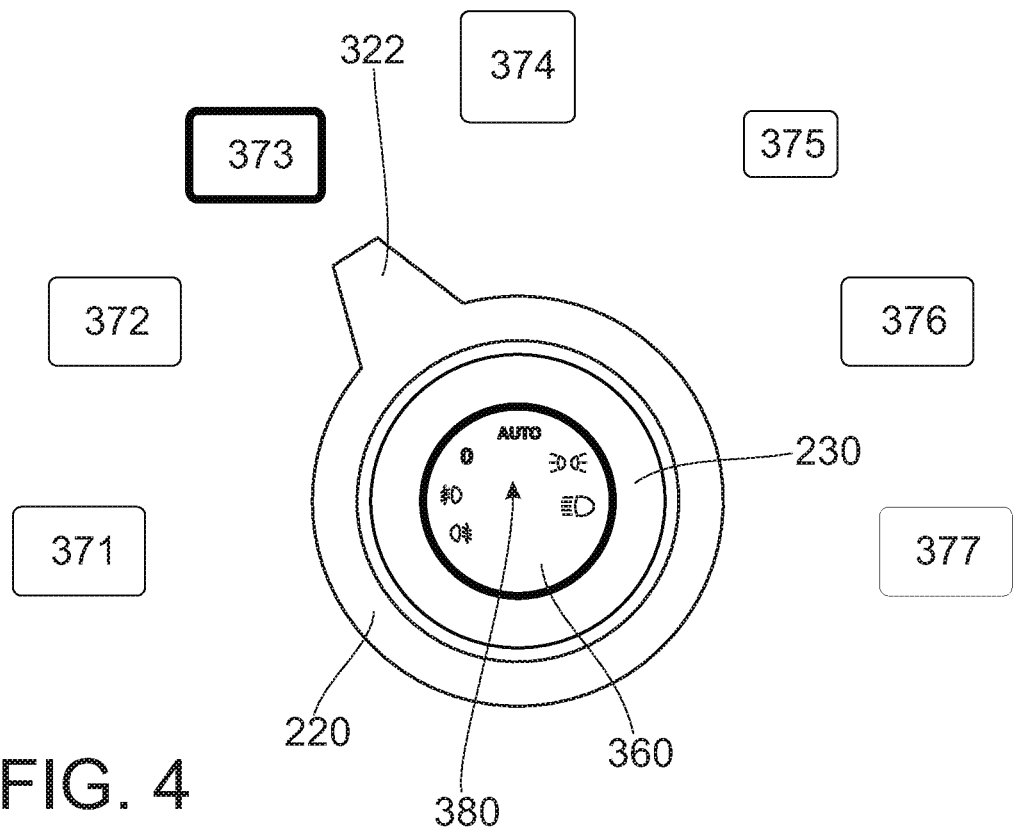
FIG. 4 shows an operating device according to an exemplary embodiment.

FIG. 4 shows an operating device 110 according to an exemplary embodiment. The operating device 110 is the operating device shown in FIG. 3. The illustration in FIG. 4 corresponds to that in FIG. 3 with the exception that a different main function has been selected. The third main function, i.e. the lighting, or lighting control, has been selected in FIG. 4. The indicator element 322 therefore points to the third symbol 373.

Specifically in reference to FIG. 3 and FIG. 4, the functioning of the operating device 110 shall be explained in brief below, in a summarizing and alternative manner. A main menu or main function is selected using the first operating element 220 of the rotating actuator, or operating device 110, which is in the form of an outer sleeve. The indicator element 322 on the first operating element 220 points to a respective, selected main function when it is rotated. The first operating element 220 has a tangible feel, with fixed and stationary notching positions, or rotational positions. In one exemplary embodiment, each main function has a fixed notching. The main functions are indicated by illuminated symbols 371, 372, 373, 374, 375, 376, and 377 surrounding the rotating actuator, or operating elements 220 and 230. When a main function has been selected, the respective subfunctions for the main function can be adjusted by rotating the inner MRF rotating actuator, or second operating element 230. The feel can be adjusted in a variable manner for each main function by the MRF actuator, or the actuator unit 240. The adjustment in the menu can be indicated in the display unit 360, which remains stationary inside the second operating element 230.

In another exemplary embodiment, the symbols 371, 372, 373, 374, 375, 376, and 377 for the main functions can also be shown on a display, the first operating element 220 can also have a single fixed position, such that it can be rotated to the left or right of the fixed position in order to toggle between the various main functions, and an external display can be used instead of the display unit 360.

Figure 5:
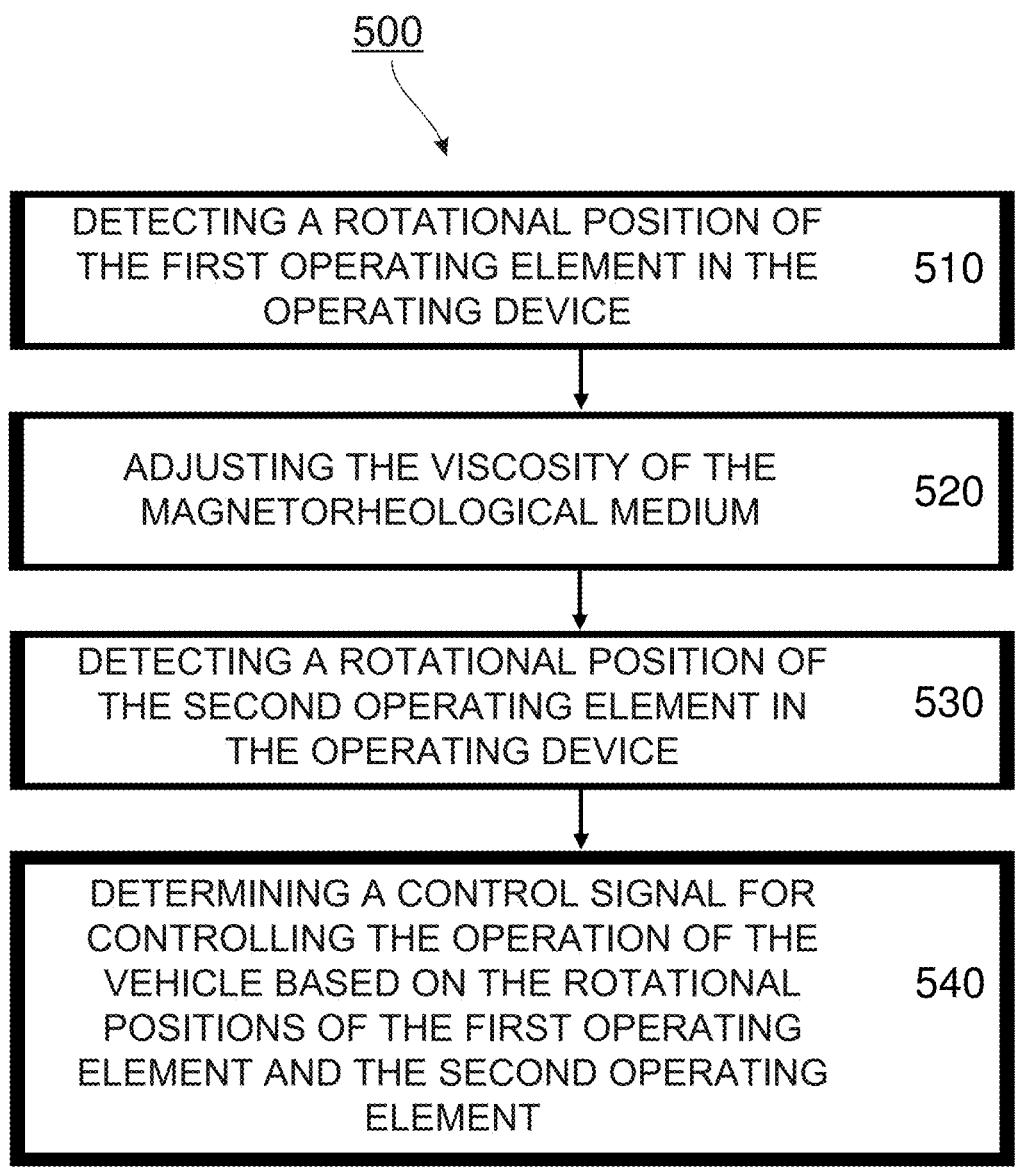
FIG. 5 shows a flow chart for a method for operating a vehicle according to an exemplary embodiment.

FIG. 5 shows a flow chart for a method 500 for operating a vehicle according to an exemplary embodiment. The vehicle in FIG. 1, or a similar vehicle, can be operated by executing the method 500. The method 500 can be executed with the operating device from any of the figures described above, or a similar operating device.

The method 500 has a first detecting step 510 for, an adjusting step 520, a second detecting step 530, and a determining step 540. In the first detecting step 510, a rotational position of the first operating element in the operating device is detected. The first detecting step 510 can be executed by the detection unit in the operating device. The viscosity of the magnetorheological medium in the actuator unit in the operating device is subsequently adjusted in the adjusting step 520 on the basis of the rotational position of the first operating element detected in the first detecting step 510. The adjusting step 520 can be executed by the actuator unit in the operating device. A rotational position of the second operating element in the operating device is subsequently detected in the second detecting step 530. The second detecting step 530 can also be executed by the detection unit in the operating device. A control signal for controlling the operation of the vehicle is then determined in the determining step 540 on the basis of the rotational position of the first operating element detected in the first detecting step 510 and on the basis of the rotational position of the second operating element detected in the second detecting step 530. The determining step 540 can be executed by the detection element or some other element in the operating device.

REFERENCE SYMBOLS 100 vehicle
102 first vehicle component
104 second vehicle component
106 third vehicle component
110 operating device
115 control signal
212 axis of rotation
220 first operating element
230 second operating element
240 actuator unit
242 magnetorheological medium
250 detection device
322 indicator element
360 display unit
371 first symbol
372 second symbol
373 third symbol
374 fourth symbol
375 fifth symbol
376 sixth symbol
377 seventh symbol
380 further symbols
500 method for operating the operating device
510 first detecting step
520 adjusting step
530 second detecting step
540 determining step

The invention claimed is:

1. An operating device for a vehicle, comprising:
a first operating element with which a user can select one of a plurality of main functions of a vehicle, wherein the first operating element is configured to rotate about an axis of rotation, wherein the first operating element has at least one predefined fixed position;
a second operating element with which a user can adjust at least one subfunction of the main function selected with the first operating element, wherein the second operating element is configured to rotate about the axis of rotation; and
an actuator unit comprising a magnetorheological medium, which is coupled to the second operating element and is configured to exert a retaining force on the second operating element on a basis of a viscosity of the magnetorheological medium,
wherein the actuator unit is configured to set the viscosity of the magnetorheological medium on a basis of the main function selected with the first operating element and on a basis of a rotational position of the second operating element.

2. The operating device according to claim 1, wherein the first operating element has a fixed rotational position for each main function.

3. The operating device according to claim 1, wherein the first operating element has an indicator element that points to the selected main function.

4. The operating device according to claim 1, further comprising symbols representing the plurality of main functions are arranged around the first operating element on the operating device, wherein the symbols are printed, illuminated, and/or displayed.

5. The operating device according to claim 1, further comprising:
a display unit configured to display the subfunctions of the main functions selected with the first operating element.

6. The operating device according to claim 5, wherein the display unit remains stationary within a circumference of the second operating element.

7. The operating device according to claim 5, wherein the display unit is located outside the first operating element and the second operating element.

8. The operating device according to claim 1, further comprising:
a detection device configured to detect a rotational position of the first operating element and the rotational position of the second operating element.

9. The operating device according to claim 8, wherein the detection device is configured to generate a control signal for controlling the operation of the vehicle using a detected rotational position of the first operating element and the detected rotational position of the second operating element.

10. The operating device according to claim 8, wherein the actuator unit is configured to set the viscosity of the magnetorheological medium on a basis of the rotational position of the first operating element.

11. The operating device according to claim 1, wherein the first operating element and the second operating element are concentric and have different radii.

12. The operating device according to claim 1, wherein the first operating element is configured to be rotated in at least one direction from a single fixed rotational position to switch between the plurality of main functions.

13. The operating device according to claim 1, wherein the first operating element and the second operating element are coaxially offset along the axis of rotation.

14. A vehicle comprising the operating device according to claim 1.

15. A method for operating a vehicle comprising:
detecting, by a detection device, a rotational position of a first operating element in an operating device of the vehicle, wherein the first operating element is configured to rotate about an axis of rotation and has at least one predefined fixed position;
adjusting, by an actuator unit, a viscosity of a magnetorheological medium in the actuator unit on a basis of the detected rotational position of the first operating element;
exerting, by the actuator unit, a retaining force on a second operating element of the operating device on a basis of the viscosity of the magnetorheological medium;
detecting, by the detection device, a rotational position of the second operating element in the operating device; and
determining a control signal for controlling the operation of the vehicle on the basis of the detected rotational position of the first operating element and the detected rotational position of the second operating element.

16. The method according to claim 15, further comprising:
adjusting, by the actuator unit, the viscosity of the magnetorheological medium on a basis of the rotational position of the second operating element.

17. The method according to claim 15, further comprising:
selecting one of a plurality of main functions of the vehicle based on the rotational position of the first operating element;
adjusting at least one subfunction of the selected main function with the second operating element.

18. The method according to claim 17, further comprising:
displaying, by a display unit, the at least one subfunction of the main function selected with the first operating element.

19. The method according to claim 15, further comprising:
pointing, with an indicator element of the first operating element, to the selected main function.

20. The method according to claim 15, further comprising:
at least one of displaying and/or illuminating symbols representing the plurality of main functions arranged around the first operating element on the operating device.

* * * * *